Jan. 20, 1959  J. P. WHELAN  2,869,718
INFUSION BAG
Filed Sept. 14, 1956

INVENTOR.
James P. Whelan
BY
J. Stanley Churchill
ATTORNEY

United States Patent Office 2,869,718
Patented Jan. 20, 1959

2,869,718
INFUSION BAG

James P. Whelan, Quincy, Mass., assignor to Pneumatic Scale Corporation, Limited, Quincy, Mass., a corporation of Massachusetts Application September 14, 1956, Serial No. 610,009

2 Claims. (Cl. 206—.5)

This invention relates to an infusion bag.

The invention has for an object to provide a novel and improved infusion bag having a handle for the bag which is characterized by novel and improved structure which enables the tag of the handle to be detachably secured to the bag for packaging purposes and to be readily detached therefrom when the bag is to be used.

With this general object in view and such others as may hereinafter appear, the invention consists in the infusion bag hereinafter described and particularly defined in the claims at the end of this specification.

In the drawings illustrating the preferred embodiment of the present invention:

In general the present invention contemplates a novel and improved infusion bag having a handle for the bag. The invention consists in the novel structure of the bag whereby the tag of the handle is detachably secured to the bag and may easily be detached therefrom.

The present infusion bag comprises a thin porous bag containing a body of infusing material having its top edge and side edges secured together. The bag is of the character of bag illustrated and described in United States patent to Howard, No. 2,634,903, dated December 12, 1944. Reference may be made to said patent for a more complete description of the bag and its method of manufacture. A handle is provided for the bag which comprises a fibrous strip secured at one end to a tag and at its other end to the bag. Provision is made for detachably securing the tag to the bag and for enabling the same to be readily detached therefrom without causing damage to the bag.

Figures 2, 3:
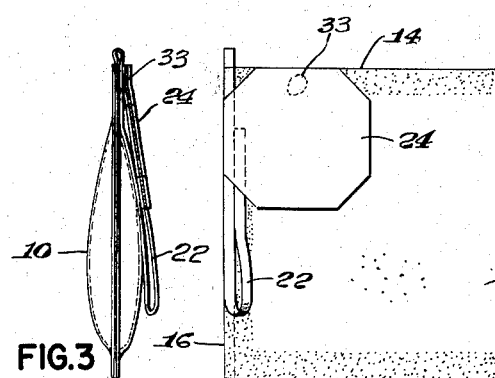
Fig. 2 is a side elevation illustrating the tag secured to an infusion bag.
Fig. 3 is an end view of the present tag and bag.
Figure 6:
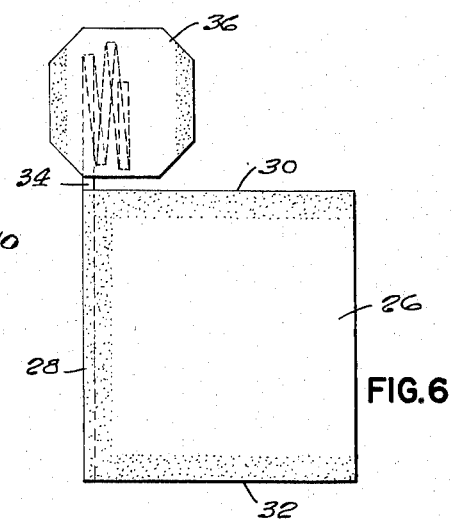
Fig. 6 is a side elevation illustrating the handle folded within the leaves of the tag.
Figure 4:
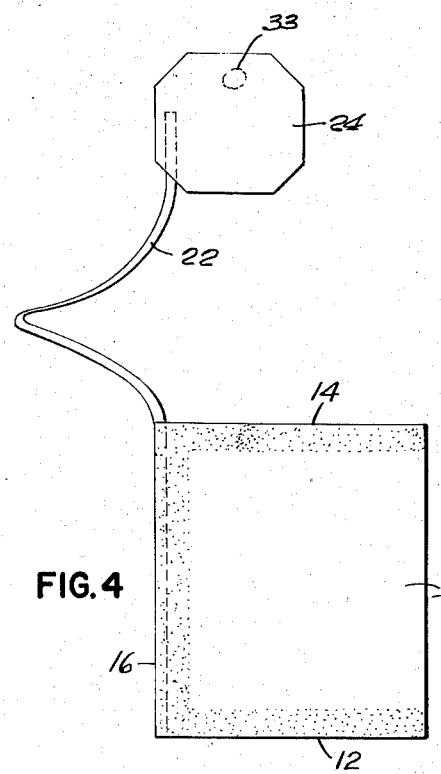
Fig. 4 is a side view illustrating the tag and handle, the tag being detached from the bag and the handle extended.
Figure 7:
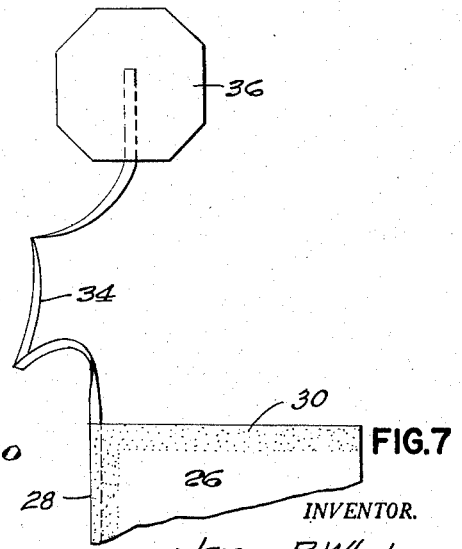
Fig. 7 is a side view illustrating the tag and handle of Fig. 6 in an extended position.

Referring now to the drawings, 10 represents the present infusion bag, which is formed by folding sheet material to provide a top edge 14, a side edge 16 and a bottom edge 12 all of which are secured together. Preferably, the edges 12, 14 and 16 may be secured together by heat sealing the same. The bag contains a body of infusing material 18 which may comprise tea or coffee or a like material. The bag is provided with a handle which comprises a thin fibrous strip 22 secured at one end to a tag 24 and having its other end disposed between and along the marginal side edge portions of the bag, as shown in Fig. 3, to secure the same to the bag 10. In practice the handle is utilized to suspend the bag in the boiling or very hot water following usual practice. For shipment a plurality of bags are packed in a container, and during the packing the handles are likely to become entangled, thereby making it difficult for the consumer to separate individual bags for use. In accordance with the present invention provision is made for detachably securing the tag to the bag in a novel manner so that the tag will remain in its attached position during packing and shipment to prevent entanglement of the handles and which will permit the tag to be readily removed from the bag without causing damage thereto when the bag is to be used.

The tag 24 comprises a pair of similar leaves 27, 29 which may and preferably will be hinged together at 31. The inner surface of each leaf is preferably coated with a thermoplastic material to enable the leaves to be secured together. While in the preferred form of the invention the coating consists of a thermoplastic material, any suitable adhesive may be used.

In accordance with the present invention provision is made for storing the fibrous strip 22 in compact relation to the bag to enable a plurality of bags to be packed in a container whereby to prevent the handles of the bags from becoming entangled with one another. The fibrous strip 22 is folded upon itself and disposed flat along the marginal side edge 16 of the bag as shown in Fig. 2. The tag 24 is then detachably secured to the bag at top edge 14 adjacent side edge 16 thereof. One of the leaves of the tag 24 is provided with a cutout portion 33 and may be adhesively secured to the bag through said portion 33, the adhesive on the tag adhering to the bag. As shown, a portion of the tag overlies the folded fibrous strip and in this manner further assists in maintaining the strip flat against the edge of the bag.

In practice whenever it is desired to utilize the bag the tag is easily detached from the bag, and the folded fibrous strip is thereupon permitted to unfold and be extended to its full length. The handle may be then used to deposit the bag in a receptacle to permit the infusion to take place in the usual manner.

Figure 1:
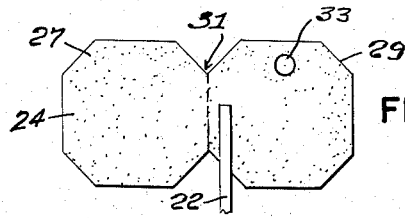
Fig. 1 is a plan view of the present tag in an open position illustrating the position of the handle.
Figure 5:
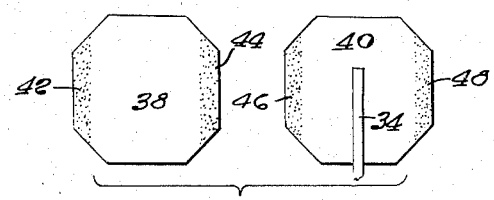
Fig. 5 is a plan view of a modified form of tag.

In a modified form of the invention illustrated in Figs. 5, 6 and 7, 26 represents an infusion bag of the character hereintofore described having its side edge 28 and top and bottom edges 30, 32, respectively, secured together in any usual or preferred manner. The bag is provided with a handle comprising an elongated fibrous strip 34 attached at one end to a tag 36 and attached at its other end to the bag 26. As illustrated in Fig. 5, the tag 36 may preferably comprise a pair of leaves 38, 40 of relatively stiff fibrous material, and each may be provided on one surface along its marginal side edges 42, 44, 46, 48 with a heat sealable adhesive material as shown. One end of the strip 34 may be adhesively secured to one of the leaves 38, 40 as shown in Fig. 5. Thereafter the intermediate portion of the fibrous strip 34 between the tag and bag is folded upon itself several times and disposed upon one of the leaves 38, 40 of the tag 36 between the adhesive portions along the side edges of the tag. The leaves 38, 40 are then superimposed upon one another and secured together, preferably by the application of heat to the adhesively coated surfaces of the superimposed leaves. In this manner the folded portions of the strip are neatly and compactly encased within the leaves 38, 40 of the tag. The tag 36 may then be detachably secured to the bag in any usual or preferred manner, as by a spot of adhesive (not shown).

It will be apparent from the foregoing description that a plurality of correspondingly similar bags may be packed within a container, and entanglement of tags and strips eliminated.

In practice after detachment of the tag 36 from the bag 26, the strip 34 may be easily pulled from its folded position within the tag 36 when it is desired to use the bag, thereby providing a handle by which the bag may be suspended for the usual infusion operation.

While for the purposes of description the handle has been described as comprising a tag and fibrous strip a relatively thin string or other similar substance may be utilized in place of the fibrous strip without departing from the scope of the invention.

Having thus described the invention, what is claimed is:

1. An infusion device comprising a bag containing an infusion material, and a handle for the bag including an elongated fibrous strip and a tag, one end of the strip being secured to the bag and the other end to the tag, said elongated strip being folded upon itself and disposed along a marginal edge of the bag, and the tag being detachably secured to a wall of the bag adjacent said marginal edge of the bag to confine the strip and the tag in close proximity to the bag whereby to avoid tangling of the handles of adjacent bags, said detachably secured tag overlying a portion of the folded fibrous strip to retain the same in its folded position along the marginal edge until the tag is detached from the bag wall to permit extension of the strip.

2. An infusion device comprising a bag containing an infusion material, and a handle for the bag including an elongated fibrous strip and a tag, one end of said elongated strip being connected to the bag and the other end to the tag, said tag comprising opposed leaves secured together to provide an open space between their marginal edges, a portion of said elongated strip adjacent the tag being folded upon itself and loosely inserted in said open space to confine the strip within the tag, said tag being detachably secured to a wall of the bag to dispose the tag in close proximity to the bag whereby to avoid tangling of the handles of adjacent bags, said inserted portion being readily withdrawn and extended for use when the tag is detached from said bag wall.

References Cited in the file of this patent

UNITED STATES PATENTS

| | | |
|---|---|---|
| 1,658,263 | Stanley | Feb. 7, 1928 |
| 2,359,271 | Sidebotham | Sept. 26, 1944 |
| 2,508,690 | Schmerl | May 23, 1950 |

UNITED STATES PATENT OFFICE
CERTIFICATE OF CORRECTION

Patent No. 2,869,718                                                  January 20, 1959

James P. Whelan

It is hereby certified that error appears in the printed specification of the above numbered patent requiring correction and that the said Letters Patent should read as corrected below.

Column 3, line 13, after "bag" insert -- along a marginal edge of the bag --; same line 13, after "end" insert -- secured --; line 14, for "along a" read -- along said --.

Signed and sealed this 2nd day of June 1959

(SEAL)
Attest:

KARL H. AXLINE                                                 ROBERT C. WATSON
Attesting Officer                                             Commissioner of Patents